United States Patent
Sato et al.

(10) Patent No.: US 12,331,195 B2
(45) Date of Patent: Jun. 17, 2025

(54) COMPOSITE MATERIAL, SHEET, AND HEAT INSULATOR

(71) Applicant: Showa Denko Materials Co., Ltd., Tokyo (JP)

(72) Inventors: Naoyoshi Sato, Minato-ku (JP); Tomohiko Kotake, Minato-ku (JP); Hiroyuki Izumi, Minato-ku (JP); Satoshi Takayasu, Minato-ku (JP)

(*) Notice: Subject to any disclaimer, the term of this patent is extended or adjusted under 35 U.S.C. 154(b) by 725 days.

(21) Appl. No.: 17/601,710

(22) PCT Filed: Apr. 10, 2019

(86) PCT No.: PCT/JP2019/015695
§ 371 (c)(1),
(2) Date: Oct. 6, 2021

(87) PCT Pub. No.: WO2020/208756
PCT Pub. Date: Oct. 15, 2020

(65) Prior Publication Data
US 2022/0195192 A1    Jun. 23, 2022

(51) Int. Cl.
*C08L 83/04* (2006.01)
*C08J 5/18* (2006.01)
*F16L 59/02* (2006.01)

(52) U.S. Cl.
CPC ............ *C08L 83/04* (2013.01); *C08J 5/18* (2013.01); *F16L 59/028* (2013.01); *C08J 2383/04* (2013.01); *C08J 2401/28* (2013.01); *C08L 2203/16* (2013.01); *C08L 2205/03* (2013.01)

(58) Field of Classification Search
CPC ............ C09D 101/02; C09D 101/28; C09D 101/284; C08J 5/18; C08J 2383/04; C08J 2401/28; C08K 3/36; C08L 83/04; C08L 2203/16; C08L 2205/03; C08L 1/02; C08L 1/28; C08L 1/284; F16L 59/028
See application file for complete search history.

(56) References Cited

FOREIGN PATENT DOCUMENTS

| | | |
|---|---|---|
| JP | H10-147664 | 6/1998 |
| JP | H11-021583 | 1/1999 |
| JP | H11-319402 | 11/1999 |
| JP | 2000-026609 | 1/2000 |
| JP | 2012-091943 | 5/2012 |
| JP | 2012-106970 | 6/2012 |
| JP | 2012-233110 | 11/2012 |
| JP | 5250900 | 7/2013 |
| JP | 2014-035044 | 2/2014 |
| JP | 2017-015205 | 1/2017 |
| JP | 2018-043927 | 3/2018 |
| JP | 2018-534219 | 11/2018 |
| KR | 20180108270 | 10/2018 |

OTHER PUBLICATIONS

International Preliminary Report on Patentability with Written Opinion dated Oct. 21, 2021 for PCT/JP2019/015695.
International Search Report dated Jul. 9, 2019 for PCT/JP2019/015695.
Feng Jingduo et al., "Silica-cellulose hybrid aerogels for thermal and acoustic insulation applications", Colloids and Surfaces A: Physiochemical and Engineering Aspects, Elsevier, Amsterdam, NL, vol. 506, Jun. 27, 2016, p. 298-p. 305.
Extended Search Report in corresponding European Application No. 19924285.0, dated Mar. 24, 2022.
Feng Jingduo et al., "Advanced fabrication and oil absorption properties of super-hydrophobic recycled cellulose aerogels", Chemical Engineering Journal, Elsevier, Amsterdam, NL, vol. 270 Feb. 14, 2015, p. 168-P175.
David Gregoire et al., "Exploring the potential of gas-phase esterification to hydrophobize the surface of micrometric cellulose particles", European Polymer Journal, vol. 115, Mar. 5, 2019, p. 138-P146.

*Primary Examiner* — Anthony J Green
(74) *Attorney, Agent, or Firm* — SOEI PATENT & LAW FIRM

(57) ABSTRACT

A composite material containing aerogel particles and at least one cellulose-based resin selected from the group consisting of cellulose and a cellulose derivative, in which a content of the aerogel particles is 95 vol % or more. A sheet containing the composite material, and a heat insulator containing the composite material.

11 Claims, No Drawings

COMPOSITE MATERIAL, SHEET, AND HEAT INSULATOR

CROSS-REFERENCE TO RELATED APPLICATIONS

This application is a 35 U.S.C. § 371 national phase application of PCT/JP2019/015695, filed on Apr. 10, 2019.

TECHNICAL FIELD

The present invention relates to a composite material, a sheet, and a heat insulator.

BACKGROUND ART

Aerogel has been known as a material excellent in heat insulation properties. Furthermore, a method of processing aerogel into a particulate shape and using the particulate aerogel as a constituent material for a heat insulator has been proposed (for example, Patent Literatures 1 and 2). In Patent Literature 1, it has been proposed that the particulate aerogel is used as a filler between resin plates, etc. constituting a heat insulated window. In Patent Literature 2, there has been described a method for producing a heat insulator (molded body) by preparing an aqueous dispersion containing aerogel particles and an organic fiber and then further press-molding an intermediate product obtained by vaporizing water.

CITATION LIST

Patent Literature

Patent Literature 1: Japanese Unexamined Patent Publication No. 2012-91943
Patent Literature 2: Japanese Unexamined Patent Publication No. 2014-35044

SUMMARY OF INVENTION

Technical Problem

An object of the present invention is to provide a composite material having an extremely high filling rate of aerogel particles and capable of forming a structural body excellent in flexibility. Furthermore, another object of the present invention is to provide a sheet made of this composite material and a heat insulator made of this composite material.

Solution to Problem

An aspect of the present invention relates to a composite material containing aerogel particles and at least one cellulose-based resin selected from the group consisting of cellulose and a cellulose derivative, in which a content of the above-described aerogel particles is 95 vol % or more. Such a composite material has an extremely high filling amount of the aerogel particles, and thus has excellent heat insulation properties. Furthermore, such a composite material can form a structural body excellent in flexibility although the filling amount of the aerogel particles is extremely high.

The above-described cellulose-based resin may contain a cellulose derivative having an alkyl group.

The above-described cellulose-based resin may contain a cellulose derivative having an alkyl group having 1 to 26 carbon atoms.

The above-described cellulose-based resin may contain a cellulose derivative having a structural unit represented by Formula (A-1) below.

[Chemical Formula 1]

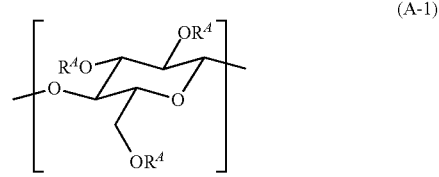

In Formula (A-1), $R^A$ represents a hydrogen atom, an alkyl group, a hydroxyalkyl group, or a group represented by $-R^{A1}-O-R^{A2}$ ($R^{A1}$ represents an alkanediyl group and $R^{A2}$ represents an alkyl group). Three $R^A$'s may be the same or different from each other. However, at least one of three $R^A$'s is an alkyl group or a group represented by $-R^{A1}-O-R^{A2}$.

Another aspect of the present invention relates to a sheet made of the aforementioned composite material. Such a sheet is made of the composite material having an extremely high filling amount of the aerogel particles, and thus is excellent in heat insulation properties. Furthermore, such a sheet has excellent flexibility, and thus is excellent in followability. From these points, the above-described sheet can be suitably used in use applications such as a sheet-shaped heat insulator.

Still another aspect of the present invention relates to a heat insulator made of the aforementioned composite material. Such a heat insulator is made of the composite material having an extremely high filling amount of the aerogel particles, and thus is excellent in heat insulation properties. Furthermore, such a heat insulator has excellent flexibility, and thus is excellent in followability.

Advantageous Effects of Invention

According to the present invention, it is possible to provide a composite material having an extremely high filling rate of aerogel particles and capable of forming a structural body excellent in flexibility. Furthermore, the present invention can provide a sheet made of this composite material and a heat insulator made of this composite material.

DESCRIPTION OF EMBODIMENTS

Hereinafter, preferred embodiments of the present invention will be specifically described. However, the present invention is not limited to the following embodiments. In the present specification, a numerical range that has been indicated by use of "to" indicates the range that includes the numerical values which are described before and after "to", as the minimum value and the maximum value, respectively. "A or B" may include either one of A and B, and may also include both of A and B. Materials listed as examples in the present embodiment may be used singly or in combinations of two or more, unless otherwise specifically indicated.

A composite material according to the present embodiment contains aerogel particles and a cellulose-based resin.

Furthermore, in the composite material according to the present embodiment, the content of the aerogel particles is 95 vol % or more. The content of the aerogel particles is more preferably 97 vol % or more and may be 99 vol % or more. Furthermore, the content of the aerogel particles may be, for example, 99.9 vol % or less, may be 99.7 vol % or less, and may be 99.5 vol % or less.

The composite material according to the present embodiment has an extremely high filling amount of the aerogel particles, and thus has excellent heat insulation properties. Furthermore, the composite material according to the present embodiment can form a structural body excellent in flexibility since the cellulose-based resin is excellent in affinity with the aerogel particles and the polymer chain of the cellulose-based resin can be complicatedly entangled while the aerogel particles are mixed.

<Aerogel>

Although dry gel obtained by using a supercritical drying method for wet gel is called aerogel, dry gel obtained by drying under atmospheric pressure is called xerogel, and dry gel obtained by freeze drying is called cryogel in the narrow sense, low-density dry gel obtained regardless of these drying technique of wet gel is referred to as "aerogel" in the present embodiment. That is, in the present embodiment, the "aerogel" means "Gel comprised of a microporous solid in which the dispersed phase is a gas" which is aerogel in the broad sense. In general, the inside of the aerogel has a network microstructure and has a cluster structure where particulate aerogel components having a size of about 2 to 20 nm are bonded. Pores smaller than 100 nm reside between skeletons formed by this cluster. Thereby, the aerogel has a three-dimensionally fine and porous structure.

The aerogel according to the present embodiment is, for example, silica aerogel composed mainly of silica. Examples of the silica aerogel include so-called organic-inorganic hybridized silica aerogel in which an organic group (such as a methyl group) or an organic chain is introduced.

As the aerogel according to the present embodiment, for example, the following embodiments are mentioned. By employing these embodiments, aerogel excellent in heat insulation properties, flame retardance, heat resistance, and flexibility is easily obtained. By employing each embodiment, aerogel excellent in heat insulation properties, flame retardance, heat resistance, and flexibility corresponding to each embodiments can be obtained.

First Embodiment

The aerogel according to the present embodiment can have a structure represented by General Formula (1) below. The aerogel according to the present embodiment can have a structure represented by General Formula (1a) below as a structure including the structure represented by Formula (1).

[Chemical Formula 2]

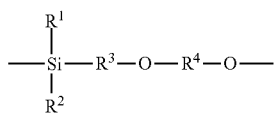

(1)

-continued

[Chemical Formula 3]

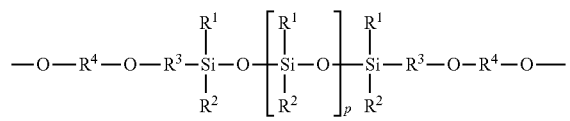

(1a)

In Formula (1) and Formula (1a), $R^1$ and $R^2$ each independently represent an alkyl group or an aryl group, and $R^3$ and $R^4$ each independently represent an alkylene group. Herein, examples of the aryl group include a phenyl group and a substituted phenyl group. Note that examples of a substituent of the substituted phenyl group include an alkyl group, a vinyl group, a mercapto group, an amino group, a nitro group, and a cyano group. "p" represents an integer of 1 to 50. In Formula (1a), two or more of $R^1$ may be the same or different from each other, and similarly, two or more of $R^2$ may be the same or different from each other. In Formula (1a), two les may be the same or different from each other, and similarly, two $R^4$'s may be the same or different from each other.

By introducing the structure represented by the above Formula (1) or Formula (1a) into the skeleton of the aerogel as an aerogel component, aerogel that has low thermal conductivity and is flexible is obtained. From such a viewpoint, in Formula (1) and Formula (1a), examples of $R^1$ and $R^2$ each independently include an alkyl group having 1 to 6 carbon atoms and a phenyl group, and examples of this alkyl group include a methyl group. Furthermore, in Formula (1) and Formula (1a), examples of $R^3$ and $R^4$ each independently include an alkylene group having 1 to 6 carbon atoms, and examples of the alkylene group include an ethylene group and a propylene group. In Formula (1a), "p" can be set to 2 to 30 and may be 5 to 20.

Second Embodiment

The aerogel according to the present embodiment can have a ladder-type structure including struts and bridges in which the bridges are represented by General Formula (2) below. Heat resistance and mechanical strength can be improved by introducing such a ladder-type structure into the skeleton of the aerogel as an aerogel component. Note that the "ladder-type structure" in the present embodiment is one having two struts and bridges connecting the struts (one having the form of a so-called "ladder"). In this embodiment, the skeleton of the aerogel may consist of a ladder-type structure, or the aerogel may partially have a ladder-type structure.

[Chemical Formula 4]

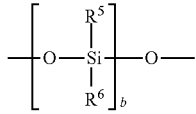

(2)

In Formula (2), $R^5$ and $R^6$ each independently represent an alkyl group or an aryl group, and "b" represents an integer of 1 to 50. Herein, examples of the aryl group include a phenyl group and a substituted phenyl group. Furthermore, examples of a substituent of the substituted phenyl group include an alkyl group, a vinyl group, a mercapto group, an amino group, a nitro group, and a cyano group. Note that in Formula (2), in a case where "b" is an integer of 2 or more, two or more of $R^5$ may be the same or different from each other, and similarly, two or more of $R^6$ may also be the same or different from each other.

For example, aerogel having more excellent flexibility than that of conventional aerogel having a structure derived from ladder-type silsesquioxane (that is, having a structure represented by General Formula (X) below) is obtained by introducing the above-described structure into the skeleton of the aerogel as an aerogel component. The silsesquioxane is polysiloxane having the composition formula: $(RSiO_{1.5})_n$ and can have various skeletal structures such as cage type, ladder type, and random type. Note that as shown in General Formula (X) below, the structure of the bridges in the conventional aerogel having a structure derived from ladder-type silsesquioxane is —O—, but the structure of the bridges in the aerogel according to the present embodiment is a structure represented by the above General Formula (2) (polysiloxane structure). However, the aerogel of this embodiment may further have a structure derived from silsesquioxane, in addition to the structure represented by General Formula (2).

[Chemical Formula 5]

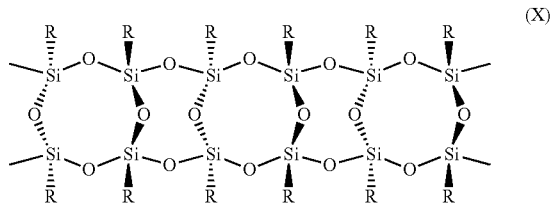

(X)

In Formula (X), "R" represents a hydroxy group, an alkyl group, or an aryl group.

Although the structures serving as the struts and the chain length thereof, and the intervals between the structures serving as the bridges are not particularly limited, from the viewpoint of further improving heat resistance and mechanical strength, examples of the ladder-type structure include a ladder-type structure represented by General Formula (3) below.

[Chemical Formula 6]

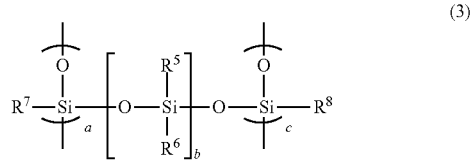

(3)

In Formula (3), $R^5$, $R^6$, $R^7$, and $R^8$ each independently represent an alkyl group or an aryl group, "a" and "c" each independently represent an integer of 1 to 3000, and "b" represents an integer of 1 to 50. Herein, examples of the aryl group include a phenyl group and a substituted phenyl group. Furthermore, examples of a substituent of the substituted phenyl group include an alkyl group, a vinyl group, a mercapto group, an amino group, a nitro group, and a cyano group. Note that in Formula (3), in a case where "b" is an integer of 2 or more, two or more of $R^5$ may be the same or different from each other, and similarly, two or more of $R^6$ may also be the same or different from each other. Furthermore, in Formula (3), in a case where "a" is an integer of 2 or more, two or more of $R^7$ may be the same or different from each other, and similarly, in a case where "c" is an integer of 2 or more, two or more of $R^8$ may be the same or different from each other.

Note that from the viewpoint of obtaining more excellent flexibility, examples of $R^5$, $R^6$, $R^7$ and $R^8$ in Formulae (2) and (3) (however, $R^7$ and $R^8$ are only in Formula (3)) each independently include an alkyl group having 1 to 6 carbon atoms and a phenyl group, and examples of this alkyl group include a methyl group. Furthermore, in Formula (3), "a" and "c" can each independently be set to 6 to 2000, and may each independently be 10 to 1000. Furthermore, in Formulae (2) and (3), "b" can be set to 2 to 30, and may be 5 to 20.

Third Embodiment

The aerogel according to the present embodiment may be a dried product of wet gel, which is a condensate of sol, containing at least one selected from the group consisting of a silicon compound having a hydrolyzable functional group or a condensable functional group and a hydrolysis product of a silicon compound having a hydrolyzable functional group (one obtained by drying wet gel produced from sol: a dried product of wet gel derived from sol). Note that the aerogel described above may also be one obtained by drying wet gel produced from sol containing a silicon compound or the like as described above.

As the silicon compound having a hydrolyzable functional group or a condensable functional group, a polysiloxane compound can be used. That is, the above-described sol can contain at least one compound selected from the group consisting of a polysiloxane compound having a hydrolyzable functional group or a condensable functional group and a hydrolysis product of a polysiloxane compound having a hydrolyzable functional group (hereinafter, referred to as "polysiloxane compound group" in some cases).

The functional group in the polysiloxane compound is not particularly limited, and can be a group reactive with the same functional group or reactive with another functional group. Examples of the hydrolyzable functional group include an alkoxy group. Examples of the condensable functional group include a hydroxyl group, a silanol group, a carboxyl group, and a phenolic hydroxyl group. The hydroxyl group may be included in a hydroxyl group-containing group such as a hydroxyalkyl group. Note that the polysiloxane compound having a hydrolyzable functional group or a condensable functional group may further have a reactive group different from the hydrolyzable functional group and the condensable functional group (a functional group that corresponds neither to the hydrolyzable functional group nor to the condensable functional group). Examples of the reactive group include an epoxy group, a mercapto group, a glycidoxy group, a vinyl group, an acryloyl group, a methacryloyl group, and an amino group. The epoxy group may be included in an epoxy group-containing group such as a glycidoxy group. The polysiloxane compound having these functional groups and reactive groups may be used singly or used as a mixture of two or more kinds thereof. Among these functional groups and reactive groups, examples of a group that improves the flexibility of the aerogel include an alkoxy group, a silanol group, and a hydroxyalkyl group, and among these, the alkoxy group and the hydroxyalkyl group can further improve the compatibility of the sol. Furthermore, the number of carbon atoms of the alkoxy group and the hydroxyalkyl group can be set to 1 to 6 from the viewpoint of improving the reactivity of the polysiloxane compound and reducing the thermal conductivity of the aerogel, and may be 2 to 4 from the viewpoint of further improving the flexibility of the aerogel.

Examples of the polysiloxane compound having a hydroxyalkyl group in the molecule include those having a structure represented by General Formula (A) below. By using the polysiloxane compound having the structure represented by General Formula (A) below, the structures represented by General Formula (1) and Formula (1a) can be introduced into the skeleton of the aerogel.

[Chemical Formula 7]

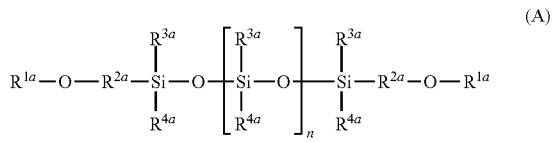

(A)

In Formula (A), $R^{1a}$ represents a hydroxyalkyl group, $R^{2a}$ represents an alkylene group, $R^{3a}$ and $R^{4a}$ each independently represent an alkyl group or an aryl group, and "n" represents an integer of 1 to 50. Herein, examples of the aryl group include a phenyl group and a substituted phenyl group. Furthermore, examples of a substituent of the substituted phenyl group include an alkyl group, a vinyl group, a mercapto group, an amino group, a nitro group, and a cyano group. Note that in Formula (A), two $R^{1a}$'s may be the same or different from each other, and similarly, two $R^{2a}$'s may be the same or different from each other. Furthermore, in Formula (A), two or more of $R^{3a}$ may be the same or different from each other, and similarly, two or more of $R^{4a}$ may be the same or different from each other.

By using wet gel (produced from the sol) that is a condensate of the sol containing the polysiloxane compound having the above-described structure, aerogel that has low thermal conductivity and is flexible is further easily obtained. From such a viewpoint, examples of $R^{1a}$ in Formula (A) include a hydroxyalkyl group having 1 to 6 carbon atoms, and examples of this hydroxyalkyl group include a hydroxyethyl group and a hydroxypropyl group. Furthermore, examples of $R^{2a}$ in Formula (A) include an alkylene group having 1 to 6 carbon atoms, and examples of this alkylene group include an ethylene group and a propylene group. Furthermore, in Formula (A), examples of $R^{3a}$ and $R^{4a}$ each independently include an alkyl group having 1 to 6 carbon atoms and a phenyl group, and examples of this alkyl group include a methyl group. Furthermore, in Formula (A), "n" can be set to 2 to 30, and may be 5 to 20.

A commercially available product can be used as the polysiloxane compound having the structure represented by the above General Formula (A), and examples thereof include compounds such as X-22-160AS, KF-6001, KF-6002, and KF-6003 (all manufactured by Shin-Etsu Chemical Co., Ltd.) and compounds such as XF42-B0970 and Fluid OFOH 702-4% (all manufactured by Momentive Performance Materials Inc.)

Examples of the polysiloxane compound having an alkoxy group in the molecule include those having a structure represented by General Formula (B) below. By using the polysiloxane compound having the structure represented by General Formula (B) below, the ladder-type structure having the bridges represented by General Formula (2) or (3) can be introduced into the skeleton of the aerogel.

[Chemical Formula 8]

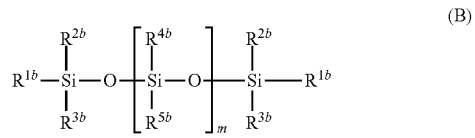

(B)

In Formula (B), $R^{1b}$ represents an alkyl group, an alkoxy group, or an aryl group, $R^{2b}$ and $R^{3b}$ each independently represent an alkoxy group, $R^{4b}$ and $R^{5b}$ each independently represent an alkyl group or an aryl group, and "in" represents an integer of 1 to 50. Herein, examples of the aryl group include a phenyl group and a substituted phenyl group. Furthermore, examples of a substituent of the substituted phenyl group include an alkyl group, a vinyl group, a mercapto group, an amino group, a nitro group, and a cyano group. Note that in Formula (B), two $R^{1b}$'s may be the same or different from each other, two $R^{2b}$'s may be the same or different from each other, and similarly, two $R^{3b}$'s may be the same or different from each other. Furthermore, in Formula (B), in a case where "m" is an integer of 2 or more, two or more of $R^{4b}$ may be the same or different from each other, and similarly, two or more of $R^{5b}$ may also be the same or different from each other.

By using wet gel (produced from the sol) that is a condensate of the sol containing the polysiloxane compound having the above-described structure or a hydrolysis product thereof, aerogel that has low thermal conductivity and is flexible is further easily obtained. From such a viewpoint, examples of $R^{1b}$ in Formula (B) include an alkyl group having 1 to 6 carbon atoms and an alkoxy group having 1 to 6 carbon atoms, and examples of this alkyl group or alkoxy group include a methyl group, a methoxy group, and an ethoxy group. Furthermore, in Formula (B), examples of $R^{2b}$ and $R^{3b}$ each independently include an alkoxy group having 1 to 6 carbon atoms, and examples of this alkoxy group include a methoxy group and an ethoxy group. Furthermore, in Formula (B), examples of $R^{4b}$ and $R^{5b}$ each independently include an alkyl group having 1 to 6 carbon atoms and a phenyl group, and examples of this alkyl group include a methyl group. Furthermore, in Formula (B), "m" can be set to 2 to 30, and may be 5 to 20.

The polysiloxane compound having the structure represented by the above General Formula (B) can be obtained appropriately with reference, for example, to any of production methods reported in Japanese Unexamined Patent Publication No. 2000-26609, Japanese Unexamined Patent Publication No. 2012-233110, and the like. Furthermore, XR31-B1410 (manufactured by Momentive Performance Materials Inc.) can also be used as this polysiloxane compound.

Note that since an alkoxy group is hydrolyzable, the polysiloxane compound having an alkoxy group is possibly present as a hydrolysis product in the sol, and the polysiloxane having an alkoxy group and a hydrolysis product thereof may coexist. Furthermore, in the polysiloxane compound having an alkoxy group, alkoxy groups in the molecule may be totally hydrolyzed or partially hydrolyzed.

These polysiloxane compound having a hydrolyzable functional group or a condensable functional group and hydrolysis product of the polysiloxane compound having a hydrolyzable functional group may be used singly or used as a mixture of two or more kinds thereof.

In the production of the aerogel according to the present embodiment, a silicon compound other than the aforementioned polysiloxane compound can be used as the silicon compound having a hydrolyzable functional group or a condensable functional group. That is, the sol containing the above-described silicon compound can contain at least one selected from a silicon compound having a hydrolyzable functional group or a condensable functional group (except for the polysiloxane compound) and a hydrolysis product of this silicon compound having a hydrolyzable functional group (hereinafter, referred to as "silicon compound group" in some cases), in addition to the aforementioned polysiloxane compound group or instead of the aforementioned polysiloxane compound group. The number of silicon atoms in the molecule of the silicon compound can be set to 1 or 2.

The silicon compound having a hydrolyzable functional group in the molecule is not particularly limited, and examples thereof include alkylsilicon alkoxide. The number of hydrolyzable functional groups of the alkylsilicon alkoxide can be set to 3 or less from the viewpoint of improving water resistance. Examples such alkylsilicon alkoxide include monoalkyltrialkoxysilane, monoalkyldialkoxysilane, dialkyldialkoxysilane, monoalkyl monoalkoxysilane, dialkyl monoalkoxysilane, and trialkyl monoalkoxysilane, and specific examples thereof include methyltrimethoxysilane, methyldimethoxysilane, dimethyldiethoxysilane, dimethyldimethoxysilane, ethyltrimethoxysilane, and hexyltrimethoxysilane. Herein, examples of the hydrolyzable functional group include an alkoxy group such as a methoxy group and an ethoxy group.

The silicon compound having a condensable functional group is not particularly limited, and examples thereof include silanetetraol, methylsilanetriol, dimethylsilanediol, phenylsilanetriol, phenylmethylsilanediol, diphenylsilanediol, n-propylsilanetriol, hexylsilanetriol, octylsilanetriol, decylsilanetriol, and trifluoropropylsilanetriol.

The silicon compound having a hydrolyzable functional group or a condensable functional group may further have the aforementioned reactive group different from the hydrolyzable functional group and the condensable functional group (a functional group that corresponds neither to the hydrolyzable functional group nor to the condensable functional group).

As the silicon compound having three or less hydrolyzable functional groups and having a reactive group, vinyltrimethoxysilane, 3-glycidoxypropyltrimethoxysilane, 3-glycidoxypropylmethyldimethoxysilane, 3-methacryloxypropyltrimethoxysilane, 3-methacryloxypropylmethyldimethoxysilane, 3-acryloxypropyltrimethoxysilane, 3-mercaptopropyltrimethoxysilane, 3-mercaptopropylmethyldimethoxysilane, N-phenyl-3-aminopropyltrimethoxysilane, N-2-(aminoethyl)-3-aminopropylmethyldimethoxysilane, or the like can also be used.

Furthermore, as the silicon compound having a condensable functional group and having a reactive group, vinylsilanetriol, 3-glycidoxypropylsilanetriol, 3-glycidoxypropylmethylsilanediol, 3-methacryloxypropylsilanetriol, 3-methacryloxypropylmethylsilanediol, 3-acryloxypropylsilanetriol, 3-mercaptopropylsilanetriol, 3-mercaptopropylmethylsilanediol, N-phenyl-3-aminopropylsilanetriol, N-2-(aminoethyl)-3-aminopropylmethylsilanediol, or the like can also be used.

Further, bistrimethoxysilylmethane, bistrimethoxysilylethane, bistrimethoxysilylhexane, ethyltrimethoxysilane, vinyltrimethoxysilane, or the like, which is a silicon compound having three or less hydrolyzable functional groups at the molecular end, can also be used.

The silicon compound having a hydrolyzable functional group or a condensable functional group (except for the polysiloxane compound) and hydrolysis product of the silicon compound having a hydrolyzable functional group may be used singly or used as a mixture of two or more kinds thereof.

By using the above-described silicon compound (except for the polysiloxane compound), the structures represented by General Formulae (4) to (6) below can be introduced into the skeleton of the aerogel. The aerogel according to the present embodiment can have any one of these structures or two or more kinds thereof.

[Chemical Formula 9]

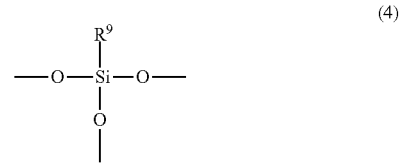

(4)

In Formula (4), $R^9$ represents an alkyl group. Herein, examples of the alkyl group include an alkyl group having 1 to 6 carbon atoms, and examples of this alkyl group include a methyl group.

[Chemical Formula 10]

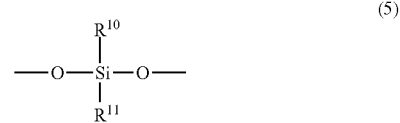

(5)

In Formula (5), $R^{10}$ and $R^{11}$ each independently represent an alkyl group. Herein, examples of the alkyl group include an alkyl group having 1 to 6 carbon atoms, and examples of this alkyl group include a methyl group.

[Chemical Formula 11]

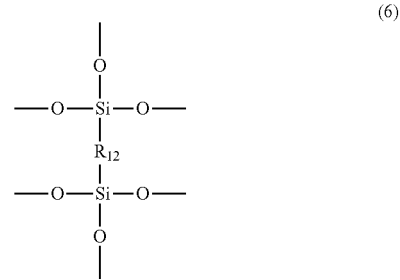

(6)

In Formula (6), $R^{12}$ represents an alkylene group. Herein, examples of alkylene group include an alkylene group having 1 to 10 carbon atoms, and examples of this alkylene group include an ethylene group and a hexylene group.

Fourth Embodiment

The aerogel according to the present embodiment may further contain silica particles in addition to the aerogel component, from the viewpoint of further toughening and the viewpoint of achieving further excellent heat insulation properties and flexibility. The aerogel containing the aerogel component and the silica particles can also be referred to as an aerogel composite. It is considered that the aerogel composite has a cluster structure that is a characteristic of the aerogel although the aerogel component and the silica particles are formed into a composite, and has a three-dimensionally fine and porous structure.

The aerogel containing the aerogel component and the silica particles can be a dried product of wet gel that is a condensate of sol containing at least one selected from the silicon compound having a hydrolyzable functional group or a condensable functional group and the hydrolysis product of the silicon compound having a hydrolyzable functional group, which are mentioned above, and silica particles. Therefore, the descriptions relating to the first embodiment to the third embodiment can also be applied to the aerogel according to the present embodiment, as appropriate.

The silica particles can be used without particular limitations, and examples thereof include amorphous silica particles. Examples of the amorphous silica particles include fused silica particles, fumed silica particles, and colloidal silica particles. Among these, the colloidal silica particles are highly monodisperse and are easily prevented from aggregating in the sol. Note that the silica particles may be silica particles having a hollow structure, a porous structure, or the like.

The shape of the silica particles is not particularly limited, and examples thereof include a spherical shape, a cocoon type, and an associated type. Among these, spherical particles are used as the silica particles and are thereby easily suppressed from aggregating in the sol. The average primary particle diameter of the silica particles may be 1 nm or more, may be 5 nm or more, and may be 20 nm or more, from the viewpoint of easily imparting moderate strength and flexibility to the aerogel and easily obtaining aerogel excellent in shrinkage resistance at the time of drying. The average primary particle diameter of the silica particles may be 500 nm or less, may be 300 nm or less, and may be 100 nm or less, from the viewpoint of easily suppressing the solid heat conduction of the silica particles and easily obtaining aerogel excellent in heat insulation properties. From these viewpoints, the average primary particle diameter of the silica particles may be 1 to 500 nm, may be 5 to 300 nm, and may be 20 to 100 nm.

In the present embodiment, the average particle diameter of the aerogel component and the average primary particle diameter of the silica particles can be obtained by directly observing the aerogel using a scanning electron microscope (hereinafter, abbreviated as "SEM"). The term "diameter" described herein means a diameter in the case of regarding the cross-section of a particle exposed on the cross-section of the aerogel as a circle. Furthermore, the "diameter in the case of regarding the cross-section as a circle" is the diameter of a true circle when the area of the cross-section is replaced with the true circle having the same area. Note that for the calculation of the average particle diameter, the diameter of a circle is determined as to 100 particles, and the average thereof is taken.

Note that the average particle diameter of the silica particles can be measured also from the raw material. For example, the two-axis average primary particle diameter is calculated as follows from results of observing 20 arbitrary particles by SEM. That is, when colloidal silica particles having a solid concentration of about 5 to 40 mass %, which are usually dispersed in water, are taken as an example, a chip obtained by cutting a patterned wafer into 2 cm square is dipped in a dispersion liquid of the colloidal silica particles for about 30 seconds, and then the chip is rinsed with pure water for about 30 seconds and dried by nitrogen blow. Thereafter, the chip is placed on a sample table for SEM observation, and the silica particles are observed at a magnification of ×100000 by applying accelerating voltage of 10 kV, followed by photographing. Twenty silica particles are arbitrarily selected from the obtained image, and the average of the particle diameters of these particles is regarded as the average particle diameter.

The number of silanol groups per 1 g of the silica particles may be $10 \times 10^{18}$ groups/g or more, may be $50 \times 10^{18}$ groups/g or more, and may be $100 \times 10^{18}$ groups/g or more, from the viewpoint of easily obtaining aerogel excellent in shrinkage resistance. The number of silanol groups per 1 g of the silica particles may be $1000 \times 10^{18}$ groups/g or less, may be $800 \times 10^{18}$ groups/g or less, and may be $700 \times 10^{18}$ groups/g or less, from the viewpoint of easily obtaining homogeneous aerogel. From these viewpoints, the number of silanol groups per 1 g of the silica particles may be $10 \times 10^{18}$ to $1000 \times 10^{18}$ groups/g, may be $50 \times 10^{18}$ to $800 \times 10^{18}$ groups/g, and may be $100 \times 10^{18}$ to $700 \times 10^{18}$ groups/g.

The content of the polysiloxane compound group contained in the above-described sol (the sum of the content of the polysiloxane compound having a hydrolyzable functional group or a condensable functional group and the content of a hydrolysis product of the polysiloxane compound having a hydrolyzable functional group) may be 5 parts by mass or more and may be 10 parts by mass or more with respect to 100 parts by mass of the total amount of the sol, from the viewpoint of further easily obtaining favorable reactivity. The content of the polysiloxane compound group contained in the above-described sol may be 50 parts by mass or less and may be 30 parts by mass or less with respect to 100 parts by mass of the total amount of the sol, from the viewpoint of further easily obtaining favorable compatibility. From these viewpoints, the content of the polysiloxane compound group contained in the above-described sol may be 5 to 50 parts by mass and may be 10 to 30 parts by mass with respect to 100 parts by mass of the total amount of the sol.

In a case where the above-described sol contains the silicon compound (except for the polysiloxane compound), the content of the silicon compound group (the sum of the content of the silicon compound having a hydrolyzable functional group or a condensable functional group and the content of a hydrolysis product of the silicon compound having a hydrolyzable functional group) may be 5 parts by mass or more and may be 10 parts by mass or more and may be 10 parts by mass or more with respect to 100 parts by mass of the total amount of the sol, from the viewpoint of further easily obtaining favorable reactivity. The content of the silicon compound group contained in the above-described sol may be 50 parts by mass or less and may be 30 parts by mass or less with respect to 100 parts by mass of the total amount of the sol, from the viewpoint of further easily obtaining favorable compatibility. From these viewpoints, the content of the silicon compound group contained in the above-described sol may be 5 to 50 parts by mass and may be 10 to 30 parts by mass.

In a case where the sol contains both the polysiloxane compound group and the silicon compound group, the ratio of the content of the polysiloxane compound group and the content of the silicon compound group may be 1:0.5 or more and may be 1:1 or more, from the viewpoint of further easily obtaining favorable compatibility. The ratio of the content of the polysiloxane compound group and the content of the silicon compound group may be 1:4 or less and may be 1:2 or less, from the viewpoint of further easily suppressing the shrinkage of the gel. From these viewpoints, ratio of the content of the polysiloxane compound group and the content of the silicon compound group may be 1:0.5 to 1:4 and may be 1:1 to 1:2.

In a case where the silica particles are contained in the above-described sol, the content of the silica particles may be 1 part by mass or more and may be 4 parts by mass or more with respect to 100 parts by mass of the total amount of the sol, from the viewpoint of easily imparting moderate strength to the aerogel and easily obtaining aerogel excellent in shrinkage resistance at the time of drying. The content of the silica particles may be 20 parts by mass or less and may be 15 parts by mass or less with respect to 100 parts by mass of the total amount of the sol, from the viewpoint of easily suppressing the solid heat conduction of the silica particles and easily obtaining aerogel excellent in heat insulation properties. From these viewpoints, the content of the silica particles may be 1 to 20 parts by mass and may be 4 to 15 parts by mass with respect to 100 parts by mass of the total amount of the sol.

<Aerogel Particles>

The aerogel particles in the present embodiment can be obtained, for example, by crushing bulk aerogel as described below.

The average particle diameter D50 of the aerogel particles can be set to 1 to 1000 μm, and may be 3 to 700 μm, may be 5 to 500 μm, may be 10 to 100 μm, and may be 10 to 50 μm. When the average particle diameter D50 of the aerogel particles is 1 μm or more, aerogel particles excellent in dispersibility, handleability, and the like are easily obtained. On the other hand, when the average particle diameter D50 is 1000 μm or less, aerogel particles excellent in dispersibility are easily obtained. The average particle diameter of the aerogel particles can be appropriately adjusted by a crushing method and conditions for crushing, the manner of sieving, classification, or the like.

The average particle diameter D50 of the aerogel particles can be measured by a laser diffraction/scattering method. For example, the aerogel particles are added to a solvent (ethanol) to have a content thereof in 0.05 to 5 mass %, and the resultant is vibrated with a 50 W ultrasonic homogenizer for 15 to 30 minutes to disperse the aerogel particles. Thereafter, about 10 mL of the dispersion liquid is injected into a laser diffraction/scattering particle size distribution analyzer, and the particle diameter is measured at 25° C. with a refractive index of 1.3 and absorption of 0. Then, a particle diameter at 50% of the cumulative value (volume-based) in the particle size distribution is used as the average particle diameter D50. As a measurement apparatus, for example, Microtrac MT3000 (manufactured by NIKKISO CO., LTD.) can be used.

Furthermore, a commercially available product can also be used as the aerogel particles. Examples of the commercially available product of the aerogel particles include ENOVA IC3100 (manufactured by Cabot Corporation) and AeroVa (manufactured by JIOS Aerogel Corporation).

<Method for Producing Aerogel Particles>

The method for producing aerogel particles is not particularly limited, and the aerogel particles can be produced, for example, by the following method.

The aerogel particles of the present embodiment can be produced by a production method mainly including: a sol forming step; a wet gel forming step of gelling the sol obtained in the sol forming step, followed by aging to obtain wet gel; a washing and solvent replacement step of subjecting the wet gel obtained in the wet gel forming step to washing and solvent replacement (as necessary); a drying step of drying the washed and solvent-replaced wet gel; and a crushing step of crushing aerogel obtained by drying.

Furthermore, the aerogel particles may be produced by a production method mainly including a sol forming step, a wet gel forming step, a wet gel crushing step of crushing wet gel obtained in the wet gel forming step, a washing and solvent replacement step, and a drying step.

The size of the obtained aerogel particles can be further homogenized by sieving, classification, or the like. By uniforming the size of the particles, dispersibility can be enhanced. Note that the "sol" means a state before the occurrence of gelling reaction, and in the present embodiment, a state where the above-described silicon compound, optionally with the silica particles, is dissolved or dispersed in a solvent. Furthermore, the wet gel means a gel solid in a wet state which contains a liquid medium but does not have fluidity.

(Sol Forming Step)

The sol forming step is a step in which the silicon compound, optionally with the silica particles (may be a solvent containing silica particles), is mixed and subjected to a hydrolysis reaction to form the sol. In this step, an acid catalyst may be further added into the solvent to accelerate a hydrolysis reaction. Furthermore, as shown in Japanese Patent No. 5250900, a surfactant, a thermally-hydrolyzable compound, or the like can also be added into the solvent. Further, a component such as carbon graphite, an aluminum compound, a magnesium compound, a silver compound, or a titanium compound may be added for the purpose of suppressing radiation of heat rays.

As the solvent, for example, water or a mixed solution of water and an alcohol can be used. Examples of the alcohol include methanol, ethanol, n-propanol, 2-propanol, n-butanol, 2-butanol, and t-butanol. Among these, examples of alcohols with a low surface tension and a low boiling point for reduction of the interfacial tension on a gel wall include methanol, ethanol, and 2-propanol. These may be used singly or used as a mixture of two or more kinds thereof.

For example, in the case of using an alcohol as the solvent, the amount of the alcohol can be set to 4 to 8 mol, may be 4 to 6.5 mol, or may be 4.5 to 6 mol with respect to 1 mol of the total amount of the silicon compound group and the polysiloxane compound group. When the amount of the alcohol is set to 4 mol or more, more favorable compatibility is further easily obtained; furthermore, when the amount of the alcohol is set to 8 mol or less, the shrinkage of the gel is further easily suppressed.

Examples of the acid catalyst include inorganic acids such as hydrofluoric acid, hydrochloric acid, nitric acid, sulfuric acid, sulfurous acid, phosphoric acid, phosphorous acid, hypophosphorous acid, bromic acid, chloric acid, chlorous acid, and hypochlorous acid; acidic phosphates such as acidic aluminum phosphate, acidic magnesium phosphate, and acidic zinc phosphate; and organic carboxylic acids such as acetic acid, formic acid, propionic acid, oxalic acid, malonic acid, succinic acid, citric acid, malic acid, adipic acid, and azelaic acid. Among these, as acid catalysts to further improve the water resistance of aerogel to be obtained, organic carboxylic acids are mentioned. As this organic carboxylic acids, acetic acid is mentioned, and formic acid, propionic acid, oxalic acid, malonic acid, and the like may be acceptable. These may be used singly or used as a mixture of two or more kinds thereof.

By using the acid catalyst, the hydrolysis reaction of the silicon compound can be accelerated and the sol can be obtained in a shorter period of time.

The amount of the acid catalyst added can be set to 0.001 to 0.1 parts by mass with respect to 100 parts by mass of the total amount of the polysiloxane compound group and the silicon compound group.

As the surfactant, a nonionic surfactant, an ionic surfactant, or the like can be used. These may be used singly or used as a mixture of two or more kinds thereof.

As the nonionic surfactant, for example, a compound including a hydrophilic moiety such as polyoxyethylene and a hydrophobic moiety mainly consisting of an alkyl group or a compound including a hydrophilic moiety such as polyoxypropylene can be used. Examples of the compound including a hydrophilic moiety such as polyoxyethylene and a hydrophobic moiety mainly consisting of an alkyl group include polyoxyethylene nonyl phenyl ether, polyoxyethylene octyl phenyl ether, and polyoxyethylene alkyl ether. Examples of the compound including a hydrophilic moiety such as polyoxypropylene include polyoxypropylene alkyl ether and a block copolymer of polyoxyethylene and polyoxypropylene.

Examples of the ionic surfactant include a cationic surfactant, an anionic surfactant, and an amphoteric surfactant. Examples of the cationic surfactant include cetyltrimethylammonium bromide and cetyltrimethylammonium chloride, and examples of the anionic surfactant include sodium dodecylsulfonate. Furthermore, examples of the amphoteric surfactant include an amino acid-based surfactant, a betaine-based surfactant, and an amine oxide-based surfactant. Examples of the amino acid-based surfactant include acylglutamic acid. Examples of the betaine-based surfactant include betaine lauryldimethylaminoacetate and betaine stearyldimethylaminoacetate. Examples of the amine oxide-based surfactant include lauryldimethylamine oxide.

In the wet gel forming step described below, these surfactants are considered to act to reduce the difference in chemical affinity between a solvent and a growing siloxane polymer in the reaction system, and thereby suppress phase separation.

The amount of the surfactant added also varies depending on the type of the surfactant or the type and amount of the silicon compound, but can be set to, for example, 1 to 100 parts by mass with respect to 100 parts by mass of the total amount of the polysiloxane compound group and the silicon compound group. Note that the addition amount may be 5 to 60 parts by mass.

The thermally-hydrolyzable compound is considered to generate a base catalyst through thermal hydrolysis to basify the reaction solution, and accelerate a sol-gel reaction in the wet gel forming step described below. Hence, the thermally-hydrolyzable compound is not particularly limited as long as it is a compound capable of basifying the reaction solution after hydrolysis, and examples thereof include urea; acid amides such as formamide, N-methylformamide, N,N-dimethylformamide, acetamide, N-methylacetamide, and N,N-dimethylacetamide; and cyclic nitrogen compounds such as hexamethylenetetramine Among these, particularly, urea easily provides the above-described accelerating effect.

The amount of the thermally-hydrolyzable compound added is not particularly limited as long as it is an amount such that the sol-gel reaction can be sufficiently accelerated in the wet gel forming step described below. For example, in the case of using urea as the thermally-hydrolyzable compound, the addition amount thereof can be set to 1 to 200 parts by mass with respect to 100 parts by mass of the total amount of the polysiloxane compound group and the silicon compound group. Note that the addition amount may be 2 to 150 parts by mass. When the addition amount is set to 1 part by mass or more, favorable reactivity is further easily obtained; furthermore, when the addition amount is set to 200 parts by mass or less, precipitation of crystals and a decrease in gel density is further easily suppressed.

Hydrolysis in the sol forming step may be performed, for example, in a temperature environment of 20° C. to 60° C. for 10 minutes to 24 hours, and may be performed in a temperature environment of 50° C. to 60° C. for 5 minutes to 8 hours, although the conditions depend on the types and amounts of the silicon compound, the silica particles, the acid catalyst, the surfactant, and the like in the mixed solution. Thereby, the hydrolyzable functional group in the silicon compound is sufficiently hydrolyzed, and a hydrolysis product of the silicon compound can be more reliably obtained.

However, in the case of adding the thermally-hydrolyzable compound into the solvent, the temperature environment in the sol forming step may be controlled to a temperature such that the hydrolysis of the thermally-hydrolyzable compound is suppressed to suppress the sol from gelling. The temperature in this case may be any temperature as long as it is a temperature such that the hydrolysis of the thermally-hydrolyzable compound can be suppressed. For example, in the case of using urea as the thermally-hydrolyzable compound, the temperature environment in the sol forming step can be set to 0° C. to 40° C. and may be 10° C. to 30° C.

(Wet Gel Forming Step)

The wet gel forming step is a step in which the sol obtained in the sol forming step is gelled and then aged to obtain wet gel. In this step, a base catalyst can be used to accelerate gelling.

Examples of the base catalyst include carbonates such as calcium carbonate, potassium carbonate, sodium carbonate, barium carbonate, magnesium carbonate, lithium carbonate, ammonium carbonate, copper(II) carbonate, iron(II) carbonate, and silver(I) carbonate; hydrogen carbonates such as calcium hydrogen carbonate, potassium hydrogen carbonate, sodium hydrogen carbonate, and ammonium hydrogen carbonate; alkali metal hydroxides such as lithium hydroxide, sodium hydroxide, potassium hydroxide, and cesium hydroxide; ammonium compounds such as ammonium hydroxide, ammonium fluoride, ammonium chloride, and ammonium bromide; basic sodium phosphate such as sodium metaphosphate, sodium pyrophosphate, and sodium polyphosphate; aliphatic amines such as allylamine, diallylamine, triallylamine, isopropylamine, diisopropylamine, ethylamine, diethylamine, triethylamine, 2-ethylhexylamine, 3-ethoxypropylamine, diisobutylamine, 3-(diethylamino)propylamine, di-2-ethylhexylamine, 3-(dibutylamino)propylamine, tetramethylethylenediamine, t-butylamine, sec-butylamine, propylamine, 3-(methylamino)propylamine, 3-(dimethylamino)propyl amine, 3-methoxyamine, dimethylethanolamine, methyldiethanolamine, diethanolamine, and triethanolamine; and nitrogen-containing heterocyclic compounds such as morpholine, N-methylmorpholine, 2-methylmorpholine, piperazine and derivatives thereof, piperidine and derivatives thereof, and imidazole and derivatives thereof. Among these, ammonium hydroxide (aqueous ammonia) is superior in that, as well as superiority in economic efficiency, it has high volatility and is less likely to remain in the aerogel particles after drying, and hence hardly deteriorates the water resistance. The above-described base catalyst may be used singly or used as a mixture of two or more kinds thereof.

By using the base catalyst, a dehydration condensation reaction or a dealcoholization condensation reaction of the silicon compound and the silica particles in the sol can be accelerated, and thus the gelling of the sol can be performed in a shorter period of time. Furthermore, thereby, wet gel with higher strength (rigidity) can be obtained. Particularly, since ammonia has high volatility and is less likely to remain in the aerogel particles, by using ammonia as the base catalyst, aerogel particles more excellent in water resistance can be obtained.

The amount of the base catalyst added can be set to 0.5 to 5 parts by mass and may be 1 to 4 parts by mass with respect to 100 parts by mass of the total amount of the polysiloxane compound group and the silicon compound group. When the addition amount is set to 0.5 parts by mass or more, gelling can be performed in a shorter period of time, and when the addition amount is set to 5 parts by mass or less, a decrease in water resistance can be further suppressed.

The gelling of the sol in the wet gel forming step may be performed in an airtight container so as not to allow the solvent and the base catalyst to volatile. The gelling temperature can be set to 30° C. to 90° C. and may be 40° C. to 80° C. When the gelling temperature is set to 30° C. or higher, gelling can be performed in a shorter period of time, and wet gel with higher strength (rigidity) can be obtained. Furthermore, when the gelling temperature is set to 90° C. or lower, the volatilization of the solvent (particularly, alcohol) is easily suppressed, and thus, gelling can be performed while volume shrinkage is suppressed.

Aging in the wet gel forming step may be performed in an airtight container so as not to allow the solvent and the base catalyst to volatile. Aging strengthens the bonding of the components constituting wet gel, and as a result, wet gel with sufficiently high strength (rigidity) for suppressing shrinkage at the time of drying can be obtained. The aging temperature can be set to 30° C. to 90° C. and may be 40° C. to 80° C. When the aging temperature is set to 30° C. or higher, wet gel with higher strength (rigidity) can be obtained, and when the aging temperature is set to 90° C. or lower, the volatilization of the solvent (particularly, alcohol) is easily suppressed, and thus, gelling can be performed while volume shrinkage is suppressed.

Note that since it is often difficult to determine when the gelling of the sol is completed, gelling and subsequent aging of the sol may be sequentially performed in a series of operations.

The gelling time and the aging time can be appropriately set depending on the gelling temperature and the aging temperature. In a case where the silica particles are contained in the sol, particularly, the gelling time can be reduced as compared with a case where the silica particles are not contained. The reason for this is speculated that the silanol group or the reactive group of the silicon compound in the sol forms hydrogen bonding or chemical bonding with the silanol group of the silica particles. Note that the gelling time can be set to 10 to 120 minutes, and may be 20 to 90 minutes. When the gelling time is set to 10 minutes or longer, homogeneous wet gel is easily obtained, and when the gelling time is set to 120 minutes or shorter, the steps from the washing and solvent replacement step to the drying step described below can be simplified. Note that the total time of the gelling time and the aging time, as a total of the step of gelling and aging, can be set to 4 to 480 hours, and may be 6 to 120 hours. When the total of the gelling time and the aging time is set to 4 hours or longer, wet gel with higher strength (rigidity) can be obtained, and when the total of the gelling time and the aging time is set to 480 hours or shorter, the effect of aging is more easily maintained.

To decease the density of aerogel particles to be obtained or increase an average pore diameter, the gelling temperature and the aging temperature may be increased within the above range or the total time of the gelling time and the aging time may be prolonged within the above range. Furthermore, to increase the density of aerogel particles to be obtained or decrease an average pore diameter, the gelling temperature and the aging temperature may be decreased within the above range or the total time of the gelling time and the aging time may be shortened within the above range.

(Wet Gel Crushing Step)

In the case of performing the wet gel crushing step, the wet gel obtained in the wet gel forming step is crushed. For crushing, for example, the wet gel is placed in a Henschel mixer or the wet gel forming step is performed in a mixer, and the mixer is operated under moderate conditions (rotational frequency and duration). Furthermore, more simply, the wet gel is placed in a sealable container or the wet gel forming step is performed in a sealable container, and crushing can be performed by shaking the wet gel for a moderate duration using a shaking apparatus such as a shaker. Note that as necessary, the particle diameter of the wet gel can also be adjusted by using a jet mill, a roller mill, a bead mill, or the like.

(Washing and Solvent Replacement Step)

The washing and solvent replacement step is a step including a step of washing the wet gel obtained by the wet gel forming step or the wet gel crushing step (washing step) and a step of replacing a washing solution in the wet gel with a solvent suitable for conditions for drying (drying step described below) (solvent replacement step). Although the washing and solvent replacement step can be performed in a manner such that the step of washing the wet gel and only the solvent replacement step is performed, the wet gel may be washed from the viewpoint of reducing impurities such as unreacted matters and byproducts in the wet gel and enabling production of aerogel particles having higher purity.

In the washing step, the wet gel obtained by the wet gel forming step or the wet gel crushing step is washed. This washing can be performed repeatedly, for example, by using water or an organic solvent. At this time, the washing efficiency can be improved by heating.

As the organic solvent, various organic solvents, such as methanol, ethanol, 1-propanol, 2-propanol, 1-butanol, acetone, methyl ethyl ketone, 1,2-dimethoxyethane, acetonitrile, hexane, toluene, diethyl ether, chloroform, ethyl acetate, tetrahydrofuran, methylene chloride, N,N-dimethylformamide, dimethylsulfoxide, acetic acid, and formic acid, can be used. The above-described organic solvent may be used singly or used as a mixture of two or more kinds thereof.

In the solvent replacement step described below, a solvent with a low surface tension can be used to suppress the shrinkage of the gel due to drying. However, the solvent with a low surface tension generally has extremely low mutual solubility with water. For this reason, in the case of using the solvent with a low surface tension in the solvent replacement step, as the organic solvent used in the washing step, a hydrophilic organic solvent having high mutual solubility with both water and the solvent with a low surface tension is mentioned. Note that the hydrophilic organic solvent used in the washing step can serve as pre-replacement for the solvent replacement step. Examples of the hydrophilic organic solvent of the above-described organic solvents include methanol, ethanol, 2-propanol, acetone, and methyl ethyl ketone. Note that methanol, ethanol, methyl ethyl ketone, and the like are excellent in terms of economic efficiency.

The amount of water or the organic solvent used in the washing step can be set to an amount such that the solvent in the wet gel can be sufficiently replaced and washed out. This amount can be set to be 3 to 10 times the volume of the wet gel. Washing can be repeated until the moisture content of the wet gel after washing reaches 10 mass % or less with respect to the mass of silica.

The temperature environment in the washing step can be a temperature equal to or lower than the boiling point of the solvent used in washing, and for example, in the case of using methanol, heating can be performed at a temperature of about 30° C. to 60° C.

In the solvent replacement step, the solvent of the wet gel washed is replaced with a predetermined solvent for replacement to suppress the shrinkage of the aerogel in the drying step. At this time, the replacement efficiency can be improved by heating. As the solvent for replacement, specifically, in the drying step, in a case where drying is performed under the atmospheric pressure at a temperature lower than the critical point of the solvent used in drying, a solvent with a low surface tension described below is mentioned. Meanwhile, in the case of performing supercritical drying, examples of the solvent for replacement include ethanol, methanol, 2-propanol, dichlorodifluoromethane, carbon dioxide, or a mixed solvent of two or more kinds thereof.

Examples of the solvent with a low surface tension include solvents with a surface tension of 30 mN/m or less at 20° C. Note that this surface tension may be 25 mN/m or less, or may be 20 mN/m or less. Examples of the solvent with a low surface tension include aliphatic hydrocarbons such as pentane (15.5), hexane (18.4), heptane (20.2), octane (21.7), 2-methylpentane (17.4), 3-methylpentane (18.1), 2-methylhexane (19.3), cyclopentane (22.6), cyclohexane (25.2), and 1-pentene (16.0); aromatic hydrocarbons such as benzene (28.9), toluene (28.5), m-xylene (28.7), and p-xylene (28.3); halogenated hydrocarbons such as dichloromethane (27.9), chloroform (27.2), carbon tetrachlorid (26.9), 1-chloropropane (21.8), and 2-chloropropane (18.1); ethers such as ethyl ether (17.1), propyl ether (20.5), isopropyl ether (17.7), butyl ethyl ether (20.8), and 1,2-dimethoxyethane (24.6); ketones such as acetone (23.3), methyl ethyl ketone (24.6), methyl propyl ketone (25.1), and diethyl ketone (25.3); and esters such as methyl acetate (24.8), ethyl acetate (23.8), propyl acetate (24.3), isopropyl acetate (21.2), isobutyl acetate (23.7), and ethyl butyrate (24.6) (a numerical value in each parenthesis indicates surface tension at 20° C., and the unit is [mN/m]). Among these, aliphatic hydrocarbons (such as hexane and heptane) have a low surface tension and are excellent in working environment. Furthermore, among these, by using a hydrophilic organic solvent such as acetone, methyl ethyl ketone, or 1,2-dimethoxyethane, the hydrophilic organic solvent can simultaneously serve as the organic solvent for the above-described washing step. Note that among these, a solvent having a boiling point of 100° C. or lower at ambient pressure may be used from the view point that drying in the drying step described below is further easily performed. The above-described solvent may be used singly or used as a mixture of two or more kinds thereof.

The amount of the solvent to be used in the solvent replacement step can be an amount such that the solvent in the wet gel after washing can be sufficiently replaced. This amount can be set to be 3 to 10 times the volume of the wet gel.

The temperature environment in the solvent replacement step can be a temperature equal to or lower than the boiling point of the solvent used in replacement, and for example, in the case of using heptane, heating can be performed at a temperature of about 30° C. to 60° C.

Note that in a case where the silica particles are contained in the gel, the solvent replacement step is not necessarily essential. The mechanism to be speculated is as follows. That is, when the silica particle functions as a support for the three-dimensional network skeleton, this skeleton is supported and the shrinkage of the gel in the drying step is suppressed. Therefore, it is considered that the gel can be subjected directly to the drying step without replacement of the solvent used in washing. As described above, by using the silica particles, the steps from the washing and solvent replacement step to the drying step can be simplified.

(Drying Step)

In the drying step, the wet gel washed and (as necessary) subjected to solvent replacement as described above is dried. Thereby, aerogel (an aerogel block or aerogel particles) can be obtained. That is, aerogel derived by drying the wet gel formed from the above-described sol can be obtained.

The technique for drying is not particularly limited, and known ambient pressure drying, supercritical drying, or freeze drying can be used. Among these, from the viewpoint of easily producing low-density aerogel, ambient pressure drying or supercritical drying can be used. Furthermore, from the viewpoint of enabling production at low cost, ambient pressure drying can be used. Note that in the present embodiment, an ambient pressure means 0.1 MPa (atmospheric pressure).

The aerogel can be obtained by drying the wet gel washed and (as necessary) subjected to solvent replacement under the atmospheric pressure at a temperature lower than the critical point of the solvent to be used in drying. The drying temperature varies depending on the type of the solvent used for replacement (the solvent used in washing in the case of not performing the solvent replacement), and can be set to 20° C. to 150° C. in consideration that drying at high temperature particularly increases the evaporation rate of the solvent and, in some cases, generates a large crack in the gel. Note that this drying temperature may be 60° C. to 120° C. Furthermore, the drying time varies depending on the volume of the wet gel and the drying temperature, and can be set to 4 to 120 hours. Note that acceleration of drying by applying a pressure lower than the critical point in a manner such that the productivity is not impaired is also encompassed in the concept of ambient pressure drying.

Furthermore, the aerogel can be obtained by applying supercritical drying to the wet gel washed and (as necessary) subjected to solvent replacement. Supercritical drying can be performed by using a known technique. Examples of the method for supercritical drying include a method of removing the solvent contained in the wet gel at a temperature and pressure equal to or higher than the critical point of the solvent. Alternatively, examples of the method for supercritical drying include a method in which the wet gel is soaked in liquified carbon dioxide, for example, under conditions of about 20° C. to 25° C. and 5 to 20 MPa to totally or partially replace the solvent contained in the wet gel with carbon dioxide, which has a critical point lower than the solvent, and single carbon dioxide or a mixture of carbon dioxide and the solvent is then removed.

The aerogel obtained by ambient pressure drying or supercritical drying as described above may be further subjected to additional drying under ambient pressure at 105° C. to 200° C. for about 0.5 to 2 hours. Thereby, aerogel having a low density and small pores are further easily obtained. The additional drying may be performed under ambient pressure at 150° C. to 200° C.

(Crushing Step)

In the case of not performing the wet gel crushing step, aerogel particles are obtained by crushing the aerogel (aerogel block) obtained by drying. This can be achieved, for example, by placing the aerogel in a jet mill, a roller mill, a bead mill, a hammer mill, or the like, and operating the mill with a moderate rotational frequency for a moderate duration.

<Cellulose-Based Resin>

In the present embodiment, the cellulose-based resin is selected from the group consisting of cellulose and a cellulose derivative. The cellulose derivative is a polymer obtained by partially modifying cellulose and can also be a modification of cellulose.

Examples of the cellulose derivative include methylcellulose, carboxymethyl cellulose, hydroxyethyl cellulose, hydroxypropyl methylcellulose, and modifications obtained by further modifying (for example, hydrophobizing) these celluloses.

The cellulose-based resin is preferably a cellulose derivative having an alkyl group and more preferably a cellulose derivative having a long-chain alkyl group having 6 to 26 carbon atoms. According to such a cellulose derivative, the effect of the present invention is more significantly exhibited. The number of carbon atoms of the long-chain alkyl group is preferably 8 to 26, more preferably 10 to 26, further preferably 12 to 26, and even more preferably 15 to 26.

The cellulose-based resin is, for example, preferably a cellulose derivative having a structural unit represented by Formula (A-1) below.

[Chemical Formula 12]

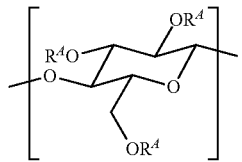

In Formula (A-1), $R^A$ represents a hydrogen atom, an alkyl group, a hydroxyalkyl group, or a group represented by $-R^{A1}-O-R^{A2}$ ($R^{A1}$ represents an alkanediyl group and $R^{A2}$ represents an alkyl group). Three $R^A$'s may be the same or different from each other; However, at least one of three $R^A$'s is an alkyl group or a group represented by $-R^{A1}-O-R^{A2}$.

In Formula (A-1), the alkyl group for $R^A$ is preferably an alkyl group having 1 to 26 carbon atoms. Furthermore, the alkyl group for $R^A$ is more preferably a short-chain alkyl group having 1 to 3 carbon atoms or a long-chain alkyl group having 6 to 26 carbon atoms. The number of carbon atoms of the long-chain alkyl group is preferably 8 to 26, more preferably 10 to 26, further preferably 12 to 26, and even more preferably 15 to 26.

In Formula (A-1), the hydroxyalkyl group for $R^A$ is preferably a hydroxyalkyl group having 1 to 26 carbon atoms, more preferably a hydroxyalkyl group having 1 to 10 carbon atoms, and further preferably a hydroxyalkyl group having 1 to 5 carbon atoms.

In Formula (A-1), $R^{A2}$ is preferably an alkanediyl group having 1 to 26 carbon atoms, more preferably an alkanediyl group having 1 to 10 carbon atoms, and further preferably an alkanediyl group having 1 to 5 carbon atoms.

In Formula (A-1), for $R^{A2}$, an alkyl group having 1 to 26 carbon atoms is preferred. Furthermore, the alkyl group for $R^A$ is more preferably a short-chain alkyl group having 1 to 3 carbon atoms or a long-chain alkyl group having 6 to 26 carbon atoms and more preferably a long-chain alkyl group. The number of carbon atoms of the long-chain alkyl group is preferably 8 to 26, more preferably 10 to 26, further preferably 12 to 26, and even more preferably 15 to 26.

In Formula (A-1), it is preferable that at least one of three $R^A$'s is a long-chain alkyl group, or at least one of three $R^A$'s is a group represented by $-R^{A1}-O-R^{A2}$ and $R^{A2}$ is a long-chain alkyl group.

In the cellulose-based resin, the content of the long-chain alkyl group having 6 to 26 carbon atoms is preferably 0.01 to 5 mass % and more preferably 0.01 to 3 mass % on the basis of the total amount of the cellulose-based resin.

In the composite material according to the present embodiment, the content of the cellulose-based resin may be, for example, 0.1 vol % or more, may be 0.3 vol % or more, and may be 0.5 vol % or more. Furthermore, the content of the cellulose-based resin may be, for example, 5 vol % or less, is preferably 3 vol % or less, and may be 1 vol % or less.

<Other Components>

The composite material according to the present embodiment may further contain components other than the aerogel particles and the cellulose-based resin.

The composite material according to the present embodiment may further contain, for example, a binder resin. Examples of the binder resin include an epoxy resin, a silicone resin, a phenol resin, a urea resin, a melamine resin, a polyurethane resin, a polyethylene resin, a polypropylene resin, a polystyrene resin, a polyester resin, an acrylic resin, a polyvinyl chloride resin, a polyvinyl acetate resin, a polyamide resin, a polyimide resin, and a polyvinyl-based resin. Among these, from the viewpoint of heat resistance and toughness, a silicone resin, an acrylic resin, a phenol resin, a polyester resin, and the like can be suitably used.

In a case where the composite material according to the present embodiment contains a binder resin, the content of the binder resin is, for example, 4 vol % or less, preferably 3 vol % or less, and more preferably 2.5 vol % or less. Thereby, the binder resin can be blended while excellent flexibility of the composite material is maintained. Furthermore, in a case where the composite material according to the present embodiment contains the binder resin, the content of the binder resin may be, for example, 0.1 vol % or more and may be 0.5 vol % or more. Thereby, there is a tendency that the toughness of the composite material is further improved and workability is improved.

Furthermore, the composite material according to the present embodiment may further contain a thickening agent, a fibrous material, a pigment, a leveling agent, and the like as components other than the above-described components.

Examples of the thickening agent include fine particles of fumed silica, clay mineral, and the like.

The fibrous material can express an anchor function among the aerogel particles, and can further improve the strength of the structural body (for example, a sheet) obtained by the composite material. The fibrous material is not particularly limited, and examples thereof include an organic fiber and an inorganic fiber. Examples of the organic fiber include polyamide fiber, polyimide fiber, polyvinyl alcohol fiber, polyvinylidene chloride fiber, polyvinyl chloride fiber, polyester fiber, polyacrylonitrile fiber, polyethylene fiber, polypropylene fiber, polyurethane fiber, phenol fiber, polyether ester fiber, polylactic fiber, and polycarbonate fiber. Examples of the inorganic fiber include a glass fiber, a carbon fiber, a ceramic fiber, and a metal fiber.

<Coating Liquid>

A coating liquid according to the present embodiment is a coating liquid containing aerogel particles, a cellulose-based resin, and a liquid medium. The content of the aerogel particles in the coating liquid is 95 vol % or more on the basis of the total volume of the solid content in the coating liquid.

With the coating liquid according to the present embodiment, a structural body (for example, a sheet) made of the aforementioned composite material can be easily produced by the coating of the coating liquid and the removal of the liquid medium.

The content of the aerogel particles and the cellulose-based resin in the coating liquid is sufficient to be in a range satisfying the content range in the aforementioned composite material after removing the liquid medium. That is, the content of the aerogel particles is 95 vol % or more, preferably 97 vol % or more, and more preferably 99 vol % or more, and for example, may be 99.9 vol % or less, may be 99.7 vol % or less, and may be 99.5 vol % or less, on the basis of the total volume of the solid content in the coating liquid. Furthermore, the content of the cellulose-based resin may be, for example, 0.1 vol % or more, may be 0.3 vol % or more, and may be 0.5 vol % or more, and for example, may be 5 vol % or less, may be 3 vol % or less, and may be 1 vol % or less, on the basis of the total volume of the solid content in the coating liquid.

As the liquid medium, an aqueous solvent containing water is preferred. An organic solvent other than water may be contained in the aqueous solvent. The organic solvent is sufficient to have compatibility with water, and examples thereof include alcohols such as methanol, ethanol, isopropanol, butanol, ethylene glycol, and propylene glycol; ethers such as diethyl ether, tetrahydrofuran, and 1,4-dioxane; ketones such as acetone and methyl ethyl ketone; carboxylic acids such as acetic acid and propionic acid; and nitrogen-containing compounds such as acetonitrile, dimethylformamide, and triethylamine.

The content of the liquid medium is not particularly limited, and may be appropriately changed according to a desired viscosity or the like of the coating liquid. The content of the liquid medium may be, for example, 40 mass % or more of the total amount of the coating liquid.

A method of coating the coating liquid is not particularly limited, and examples thereof include dip coating, spray coating, spin coating, and roll coating.

A method of removing the liquid medium from the coated coating liquid is not particularly limited, and examples thereof include methods of performing a heating (for example, 40° C. to 150° C.) treatment, a decompression (for example, 10000 Pa or less) treatment, or both of these treatments.

<Structural Body of Composite Material>

The structural body made of the aforementioned composite material has excellent heat insulation properties, and furthermore, has excellent flexibility since the filling amount of the aerogel particles is extremely high. Therefore, the structural body made of the aforementioned composite material can be suitably used in use applications such as a heat insulator, an automobile, and a clothing material.

The shape of the structural body is not particularly limited, and may be, for example, a sheet shape, a block shape, a roll shape, a string shape, and a granular shape.

Hereinbefore, the preferred embodiments of the present invention have been described, but the present invention is not limited to the above-described embodiments.

EXAMPLES

Next, the present invention will be more specifically described by way of the following Examples, but these Examples do not limit the present invention.

Example 1

100 parts by mass (99.2 vol %) of aerogel particles (manufactured by JIOS Aerogel Corporation, product name: AeroVa), 5 parts by mass of hydrophobized hydroxypropyl methylcellulose (manufactured by Daido Chemical Corporation, product name: SANGELOSE 90L), 20 parts by mass of isopropyl alcohol, and 410 parts by mass of water were mixed to obtain a paste. This paste was coated on a metal plate such that the thickness after drying became 4 mm, and the paste was dried at room temperature for 1 day, thereby obtaining a sheet made of the composite material.

Example 2

A sheet made of a composite material was obtained in the same manner as in Example 1, except that the amount of aerogel particles blended was changed to 97.2 vol % and the binder resin (DV759-EF, manufactured by DIC Corporation) was further added to have a content of 2.0 vol %.

Example 3

A sheet made of a composite material was obtained in the same manner as in Example 1, except that the amount of aerogel particles blended was changed to 95.0 vol % and the binder resin (DV759-EF, manufactured by DIC Corporation) was further added to have a content of 4.2 vol %.

Comparative Example 1

A sheet made of a composite material was obtained in the same manner as in Example 1, except that the amount of aerogel particles blended was changed to 90.0 vol % and the binder resin (DV759-EF, manufactured by DIC Corporation) was further added to have a content of 9.2 vol %.

(Measurement of Thermal Conductivity)

Sheet-shaped measurement samples having a size of 180 mm×180 mm×4 mm were cut off from the sheets obtained in Examples and Comparative Example, and the thermal conductivity was measured by a thermal conductivity measurement method (HFM method) defined in JIS A 9526. Results are shown in Table 1.

(Measurement of Flexibility)

Sheet-shaped measurement samples having a size of 180 mm×180 mm×4 mm were cut off from the sheets obtained in Examples and Comparative Example. The measurement samples were placed on bases having a height of 5.0 cm and installed with an interval of 15 cm, and a 20 g weight was placed thereon. The degree of the measurement sample being sunk between the bases was measured and a value thereof was regarded as the amount of deflection (cm). Note that a case where the amount of deflection is 5.0 cm indicates that the measurement sample was completely sunk between the bases. Results are shown in Table 1.

TABLE 1

|  | Example 1 | Example 2 | Example 3 | Comparative Example 1 |
|---|---|---|---|---|
| Aerogel particles (vol %) | 99.2 | 97.2 | 95 | 90 |
| Thermal conductivity (W/m · K) | 0.021 | 0.024 | 0.026 | 0.029 |
| Amount of deflection (cm) | 5.0 | 5.0 | 0.5 | 0 |

As shown in Table 1, in Examples, as compared with Comparative Example 1, a composite material excellent in thermal conductivity and flexibility was obtained.

The invention claimed is:

1. A composite material comprising:
aerogel particles; and
a cellulose derivative having an alkyl group having 6 to 26 carbon atoms,
wherein a content of the aerogel particles is 95 vol % or more.

2. The composite material according to claim 1, wherein the cellulose derivative has a structural unit represented by Formula (A-1)

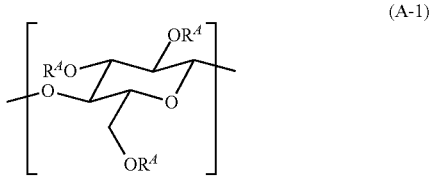

(A-1)

wherein $R^4$ represents a hydrogen atom, an alkyl group, a hydroxyalkyl group, or a group represented by —$R^{41}$—O—$R^{42}$ (in which $R^{41}$ represents an alkanediyl group and $R^{42}$ represents an alkyl group), and
wherein at least one instance of $R^4$ in the Formula (A-1) is the alkyl group having 6 to 26 carbon atoms or a group represented by —$R^{41}$—O—$R^{42}$ (in which RAI represents an alkandiyl group and $R^{42}$ represents the alkyl group having 6 to 26 carbon atoms).

3. A sheet comprising the composite material according to claim 1.

4. A heat insulator comprising the composite material according to claim 1.

5. A composite material comprising:
aerogel particles; and
at least one cellulose-based resin selected from the group consisting of cellulose and a cellulose derivative,
wherein a content of the aerogel particles is 95 vol % or more, and
wherein a content of the cellulose-based resin is 0.1 vol % or more and 3 vol % or less.

6. A sheet comprising the composite material according to claim 5.

7. A heat insulator comprising the composite material according to claim 5.

8. A composite material comprising:
aerogel particles;
at least one cellulose-based resin selected from the group consisting of cellulose and a cellulose derivative; and
a binder resin,
wherein a content of the aerogel particles is 95 vol % or more.

9. The composite material according to claim 8, wherein a content of the binder resin is 0.1 vol % or more and 4 vol % or less.

10. A sheet comprising the composite material according to claim 8.

11. A heat insulator comprising the composite material according to claim 8.

* * * * *